US012571181B2

(12) United States Patent
Walker et al.

(10) Patent No.: US 12,571,181 B2
(45) Date of Patent: Mar. 10, 2026

(54) APPARATUS FOR REMOVING MATERIAL FROM A FLOOR OF A BODY OF WATER

(71) Applicant: Soil Machine Dynamics Limited, Wallsend Tyne and Wear (GB)

(72) Inventors: John Graeme Walker, Wallsend Tyne and Wear (GB); Roger White, Wallsend Tyne and Wear (GB); Charlotte Anderson, Wallsend Tyne and Wear (GB)

(73) Assignee: Soil Machine Dynamics Limited, Wallsend Tyne and Wear (GB)

( * ) Notice: Subject to any disclaimer, the term of this patent is extended or adjusted under 35 U.S.C. 154(b) by 287 days.

(21) Appl. No.: 17/916,551

(22) PCT Filed: Mar. 10, 2021

(86) PCT No.: PCT/EP2021/056106
§ 371 (c)(1),
(2) Date: Sep. 30, 2022

(87) PCT Pub. No.: WO2021/197784
PCT Pub. Date: Oct. 7, 2021

(65) Prior Publication Data
US 2023/0175231 A1     Jun. 8, 2023

(30) Foreign Application Priority Data
Apr. 2, 2020     (EP) .................................... 20167672

(51) Int. Cl.
E02F 7/00          (2006.01)
B01D 21/00          (2006.01)
(Continued)

(52) U.S. Cl.
CPC ............ E02F 7/00 (2013.01); B01D 21/0042 (2013.01); B07B 1/00 (2013.01); E02F 3/8866 (2013.01);
(Continued)

(58) Field of Classification Search
CPC .......... E21C 50/00; E02F 5/006; E02F 7/005; E02F 3/8866; E02F 7/00
(Continued)

(56) References Cited

U.S. PATENT DOCUMENTS 590,392 A   *   9/1897   Emerson
3,480,326 A       11/1969   Sheary, III et al.
(Continued)

FOREIGN PATENT DOCUMENTS

CN          109555505 A       4/2019
EP          3 342 976 A1       7/2018
(Continued)

OTHER PUBLICATIONS

CN 107503752 (Year: 2017).*
(Continued)

*Primary Examiner* — Sunil Singh
(74) *Attorney, Agent, or Firm* — Foley & Lardner LLP

(57)          ABSTRACT

A vehicle (6) apparatus for removing material from the seabed is disclosed. The vehicle comprises first thrusters (10) for moving the vehicle vertically and second thrusters (12) for moving the vehicle horizontally. A collector unit (16) removes material from the seabed, and a latching mechanism (42) is adapted to be connected to a riser to enable removed material to be transported to a vessel on the surface.

6 Claims, 14 Drawing Sheets

Fig.3

(51) Int. Cl.
B07B 1/00 (2006.01)
E02F 3/88 (2006.01)
E02F 3/92 (2006.01)
E21C 50/00 (2006.01)
*C02F 1/00* (2023.01)
*C02F 103/08* (2006.01)

(52) U.S. Cl.
CPC ............ E02F 3/9256 (2013.01); E21C 50/00 (2013.01); *C02F 2001/007* (2013.01); *C02F 2103/08* (2013.01); *C02F 2201/008* (2013.01)

(58) Field of Classification Search
USPC .......... 299/8, 9; 37/307, 309, 313, 314, 317, 37/320, 324
See application file for complete search history.

(56) References Cited

U.S. PATENT DOCUMENTS

| | | | |
|---|---|---|---|
| 3,971,593 A | 7/1976 | Porte et al. | |
| 4,070,061 A | 1/1978 | Obolensky | |
| 4,147,390 A * | 4/1979 | Deliege .................... | E02F 3/92 299/8 |
| 4,368,923 A | 1/1983 | Handa et al. | |
| 4,391,468 A | 7/1983 | Funk | |
| 4,713,896 A | 12/1987 | Jennens | |
| 6,273,642 B1 | 8/2001 | Anderson | |
| 9,334,734 B2 | 5/2016 | Hong et al. | |
| 2010/0043256 A1 | 2/2010 | Susman et al. | |
| 2014/0283420 A1* | 9/2014 | Patriciu .................. | E02F 3/902 37/313 |
| 2015/0047233 A1 | 2/2015 | Hong et al. | |
| 2019/0345688 A1 | 11/2019 | Crowther et al. | |
| 2022/0178108 A1* | 6/2022 | Halkyard ................. | E02F 3/94 |

FOREIGN PATENT DOCUMENTS

| | | | |
|---|---|---|---|
| GB | 2 573 588 A | 11/2019 | |
| JP | S50-043001 A | 4/1975 | |
| JP | S58-013895 A | 1/1983 | |
| WO | WO-87/05878 A1 | 10/1987 | |
| WO | WO-01/92650 A1 | 12/2001 | |
| WO | WO-2007/064213 A1 | 6/2007 | |
| WO | WO-2012/158028 A1 | 11/2012 | |
| WO | WO-2017/038148 A1 | 3/2017 | |
| WO | WO-2017/098256 A1 | 6/2017 | |
| WO | WO-2018/220408 A1 | 12/2018 | |
| WO | WO-2019/086864 A1 | 5/2019 | |

OTHER PUBLICATIONS

Extended European Search Report dated Nov. 16, 2020 on EPO App. 20167672.3-1016 (11 pages).
International Preliminary Report on Patentability for PCT App. PCT/GB2021/050824 dated Sep. 29, 2022 (7 pages).
International Search Report and Written Opinion on PCT App. PCT/GB2021/050824 dated Sep. 7, 2021 (10 pages).
AP Search Report for Application No. 2023/014668 mailing date Jun. 12, 2025, 2 pages.
JP Office Action for Application No. 2022-560273 mailing date Jun. 17, 2025, 9 pages with English translation.
CN First Office Action for Application No. 202180032585.3 mailing date Apr. 25, 2025, 19 pages with English translation.
JP Office Action for Application No. 2022-560273 mailing date Feb. 4, 2025, 21 pages with English translation.
Office Action on KR Patent App. No. 10-2022-7038149 dated Dec. 16, 2025, 13 pages, with English translation.

* cited by examiner

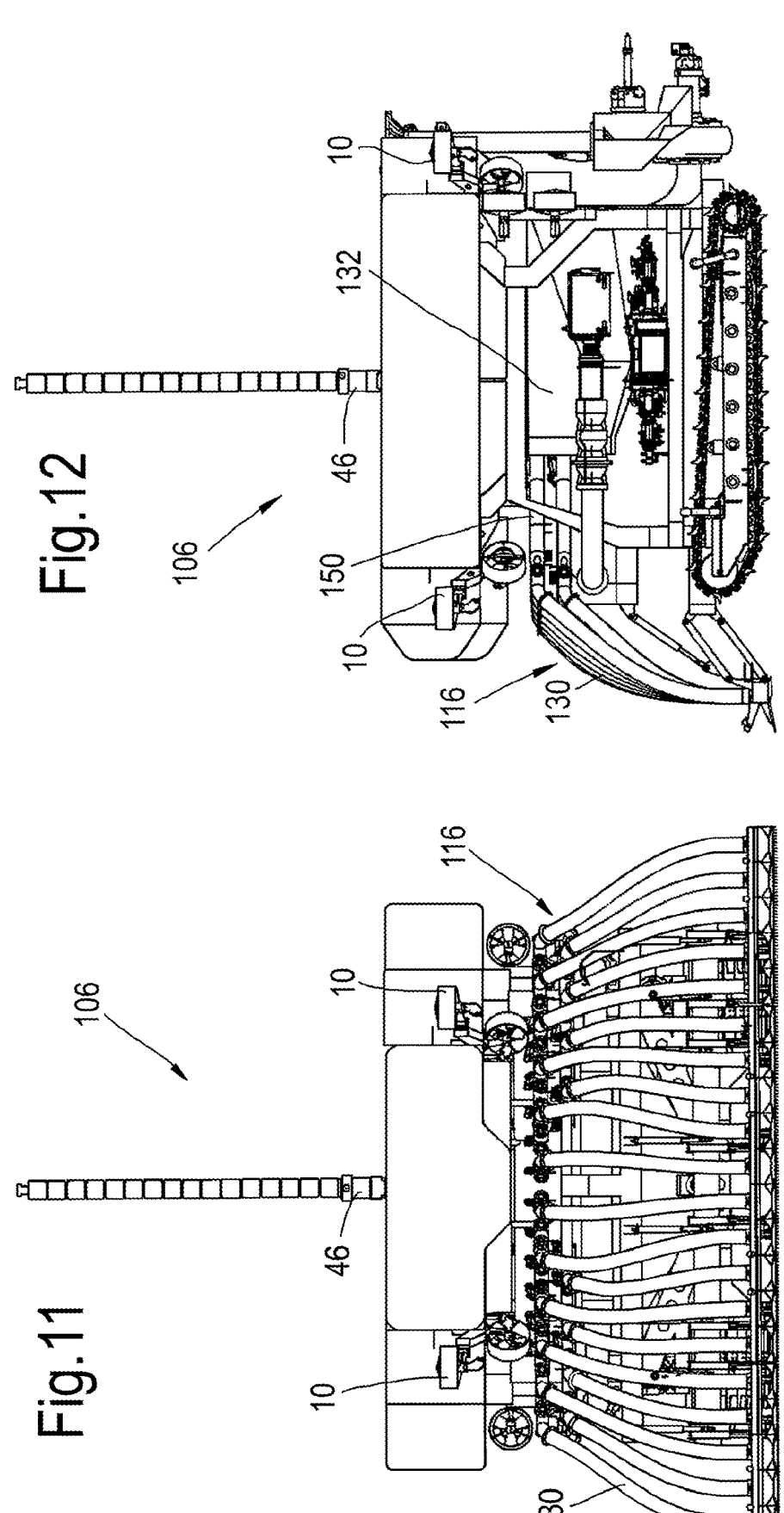

APPARATUS FOR REMOVING MATERIAL FROM A FLOOR OF A BODY OF WATER

CROSS-REFERENCE TO RELATED APPLICATIONS

This application is U.S. National Phase Application of the International Application PCT/EP2021/056106, filed Mar. 10, 2021, which claims priority under 35 U.S.C. 119 to EP20167672.3, filed Apr. 2, 2020, which is incorporated by reference in its entirety.

TECHNICAL FIELD

The present disclosure relates to an apparatus for removing material from a floor of a body of water, and relates particularly, but not exclusively, to an apparatus for removing nodular material from the seabed.

BACKGROUND

Nodules of material including minerals and rare metals form on the seabed in significant depths of water. It is known to mine such material by means of a mining apparatus which rests on the seabed and is supplied with electrical power from a surface vessel via an umbilical cable, wherein the apparatus is connected to a conduit known as a jumper hose, via which the nodular material is pumped to the surface vessel by means of a riser pump.

Known apparatus of this type suffers from a number of drawbacks. Firstly, manipulators or remotely operated vehicles (ROVs) are required to assist in connecting the apparatus to the jumper hose. Also, because the weight of the apparatus as it is lowered from the surface vessel to the seabed and raised from the seabed is supported by the umbilical cable, significant mechanical strengthening of the umbilical cable is necessary. The mechanical reinforcement necessary for the umbilical cable generally has poor heat conducting properties, as a result of which the umbilical cable insulation heats up, which in turn limits the electrical power which can be supplied to the apparatus. In addition, the catenary curve of the reinforced umbilical cable is similar to that of the jumper hose used to transport the nodular material to the surface, as a result of which there is a risk of collision between the umbilical cable and a conduit during operation of the apparatus. A further disadvantage of known such apparatus is the difficulty of operation of the apparatus in very soft ground.

SUMMARY

Preferred embodiments of the present disclosure seek to overcome one or more of the above disadvantages.

According to an aspect of the disclosure, there is provided an apparatus for separating nodular material from non-nodular material, the apparatus comprising:

at least one container for receiving liquid containing nodular material and non-nodular material;

at least one respective inlet for enabling liquid containing nodular material and non-nodular material to enter at least one said container;

at least one respective first outlet for enabling liquid to exit at least one said container; and at least one respective second outlet for enabling liquid to exit at least one said container, wherein at least one said second outlet is arranged at a greater height than at least one said first outlet provided on the corresponding said container, and entry of liquid via at least one said inlet into the container causes reduction in velocity of the liquid.

By providing at least one respective second outlet for enabling liquid to exit at least one said container, wherein at least one said second outlet is arranged at a greater height than at least one said first outlet provided on the corresponding said container, and entry of liquid via at least one said inlet into the container causes reduction in velocity of the liquid, this provides the advantage of enabling the reduction in liquid velocity to be such that the concentration of nodular material in liquid exiting at a first outlet increases and the concentration of non-nodular material in liquid exiting at a second outlet increases. In the case of removal of nodular material from the seabed, this provides the further advantage that the amount of undesired non-nodular material removed to a surface vessel is reduced, thereby reducing the environmental impact of returning non-nodular material which has been removed to a surface vessel to the seabed, for example by making it viable to transport such non-nodular material to shore.

The apparatus may further comprise barrier means for obstructing a shortest path from at least one said inlet to at least one said second outlet.

This provides the advantage of making it more difficult for nodular material than non-nodular material to reach a second outlet, thereby minimising loss of nodular material, and increasing the concentration of nodular material in the vicinity of at least one first outlet.

The barrier means may comprise at least one plate.

The barrier means may cause liquid to travel from at least one said inlet to at least one said second outlet by passing under said barrier means.

This provides the advantage of enabling nodular material to be urged towards at least one said first outlet while making it difficult for nodular material to reach the second outlet, thereby minimising loss of nodular material, and increasing the concentration of nodular material in the vicinity of at least one first outlet.

The apparatus may further comprise flow redirecting means for redirecting flow of liquid towards at least one said first outlet.

This provides the advantage of increasing the concentration of nodular material in the vicinity of one or more first outlets while minimising turbulence of flow, thereby providing better control of the process for separating nodular material from non-nodular material.

The flow redirecting means may comprise a curved surface.

At least one said container may comprise a respective body tapering towards at least one said first outlet.

This provides the advantage of increasing concentration of nodular material in the vicinity of one or more first outlets, thereby increasing the efficiency of the process for separating nodular material from non-nodular material.

At least one said container may comprise a lower surface inclined towards at least one said first outlet.

This provides the advantage of increasing concentration of nodular material in the vicinity of one or more first outlets, thereby increasing the efficiency of the process for separating nodular material from non-nodular material. This is especially the case when the apparatus is vibrating in use.

At least one said inlet may be directed towards a substantially central portion of a said container in a direction transverse to a direction extending from at least one said inlet to at least one said first outlet.

This provides the advantage of concentrating flow of liquid containing nodules towards one or more first outlets, while minimising turbulence, thereby increasing the efficiency of the process for separating nodular material from non-nodular material.

At least one said inlet may define a nozzle.

This provides the advantage of assisting in reducing the velocity of liquid containing nodular material and non-nodular material, thereby assisting the separation process.

The apparatus may further comprise pump means for directing liquid to at least one said inlet and/or directing liquid out of at least one said first outlet and/or directing liquid out of at least one said second outlet.

According to another aspect of the disclosure, there is provided an apparatus for removing nodular material from a floor of a body of water, the apparatus comprising:

> moving means for moving the apparatus relative to a floor of a body of water;
> material removing means for removing nodular material from the floor of the body of water;
> connector means adapted to be connected to a conduit to enable said removed nodular material to be transported to a vessel on the surface of the body of water; and
> an apparatus for separating nodular material from non-nodular material as defined above.

According to a further aspect of the disclosure, there is provided an apparatus for removing material from a floor of a body of water, the apparatus comprising:

> first moving means for moving the apparatus substantially vertically relative to a floor of a body of water;
> second moving means for moving the apparatus substantially horizontally relative to the floor of the body of water;
> material removing means for removing material from the floor of the body of water; and
> connector means adapted to be connected to a conduit to enable said removed material to be transported to a vessel on the surface of the body of water.

By providing first moving means for moving the apparatus substantially vertically relative to a floor of a body of water and second moving means for moving the apparatus substantially horizontally relative to the floor of the body of water, this provides a number of significant advantages. Firstly, no manipulator or remotely operated vehicle (ROV) assistance is required to enable the apparatus to be connected to the conduit. The advantage is also provided that the first moving means enables the apparatus to operate more effectively on very soft ground. The advantage is also provided that deployment of the apparatus to the sea bed can take place without the use of a taut umbilical, as a result of which less reinforcement of the umbilical is necessary, thereby enabling more electrical power to be supplied to the apparatus via the umbilical, while also enabling the apparatus to be deployed a greater distance from the surface vessel. The advantage is furthermore provided of enabling the apparatus to be more quickly exchanged for another apparatus for maintenance purposes, while also enabling the apparatus to be manoeuvred more easily and without using the umbilical, thereby enabling more thorough material removal to be carried out.

The first moving means may comprise at least one thruster.

The second moving means may comprise at least one thruster.

The second moving means may comprise a plurality of tracks.

This provides the advantage of enable steering of the apparatus on very soft ground.

The apparatus may further comprise buoyancy means for reducing the weight of the apparatus in water.

This provides the advantage of assisting operation of the first moving means. In addition, the advantage is provided that less mechanical strengthening of the umbilical cable is necessary, as a result of which larger electrical power can be delivered to the apparatus as a result of reduced heating of the umbilical cable insulation. Also, as a result of the different catenary curve of the umbilical cable having less mechanical reinforcement, it is easier to separate the umbilical cable from the conduit, as a result of which the likelihood of collision between the umbilical cable and the conduit during operation of the apparatus is minimised.

The apparatus may further comprise containment means for containing said removed material prior to transport thereof to a vessel.

According to a further aspect of the disclosure, there is provided an apparatus for removing nodular material from a floor of a body of water, the apparatus comprising:

> moving means for moving the apparatus relative to a floor of a body of water;
> material removing means for removing nodular material from the floor of the body of water; and
> connector means adapted to be connected to a conduit to enable said removed nodular material to be transported to a vessel on the surface of the body of water;
> wherein the material removing means comprises at least one inlet and floor engaging means for engaging the floor of the body of water, wherein the floor engaging means comprises a plurality of protrusions adapted to be arranged forwards of at least one said inlet in a direction of travel of the apparatus and to extend substantially in a direction of travel of the apparatus.

By providing floor engaging means comprising a plurality of protrusions adapted to be arranged forwards of at least one said inlet in a direction of travel of the apparatus and to extend substantially in a direction of travel of the apparatus, this provides the advantage of enabling nodular material on the surface of the sea bed to be collected, while minimising the disturbance of the sea bed, thereby minimising the environmental impact of removing the nodular material. The further advantage is provided that the lower extent of disturbance of the seabed causes less drag, thereby resulting in less energy consumption.

The protrusions may comprise a plurality of tines.

The apparatus may comprise at least one first aperture arranged rearwards of at least one said inlet in a direction of travel of the apparatus for allowing nodular material to pass therethrough.

This provides the advantage of preventing the inlet becoming blocked by nodular material in the event of failure of the apparatus to remove the nodular material to the conduit.

The apparatus may further comprise separator means arranged adjacent at least one said inlet for separating nodular material from non-nodular material of the floor of the body of water.

By providing separator means for separating nodular material from non-nodular material of the floor of the body of water, this provides the advantage of minimising the amount of unwanted non-nodular material, such as sediment, of the floor of the body of water which is transported to the surface, thereby minimising energy consumption, and avoiding the environmental impact of returning to the sea bed non-nodular material which has previously been removed to the surface.

The separator means may include at least one surface inclined in use relative to the floor of the body of water and having at least one second aperture therethrough for enabling non-nodular material to pass therethrough and preventing said nodular material from passing therethrough.

The apparatus may further comprise suction means for removing nodular material from at least one said inlet.

The suction means may be adapted to reverse the direction of flow of water therethrough.

This provides the advantage of assisting clearing of blockages.

BRIEF DESCRIPTION OF THE DRAWINGS

Embodiments will now be described, by way of example only and not in any limitative sense, with reference to the accompanying drawings, in which:

FIG. 11 is a front view of an apparatus of a second embodiment with a collector unit having ducts in an unfolded condition;

FIG. 12 is a side view of the apparatus of FIG. 11;

DETAILED DESCRIPTION

Figure 1:
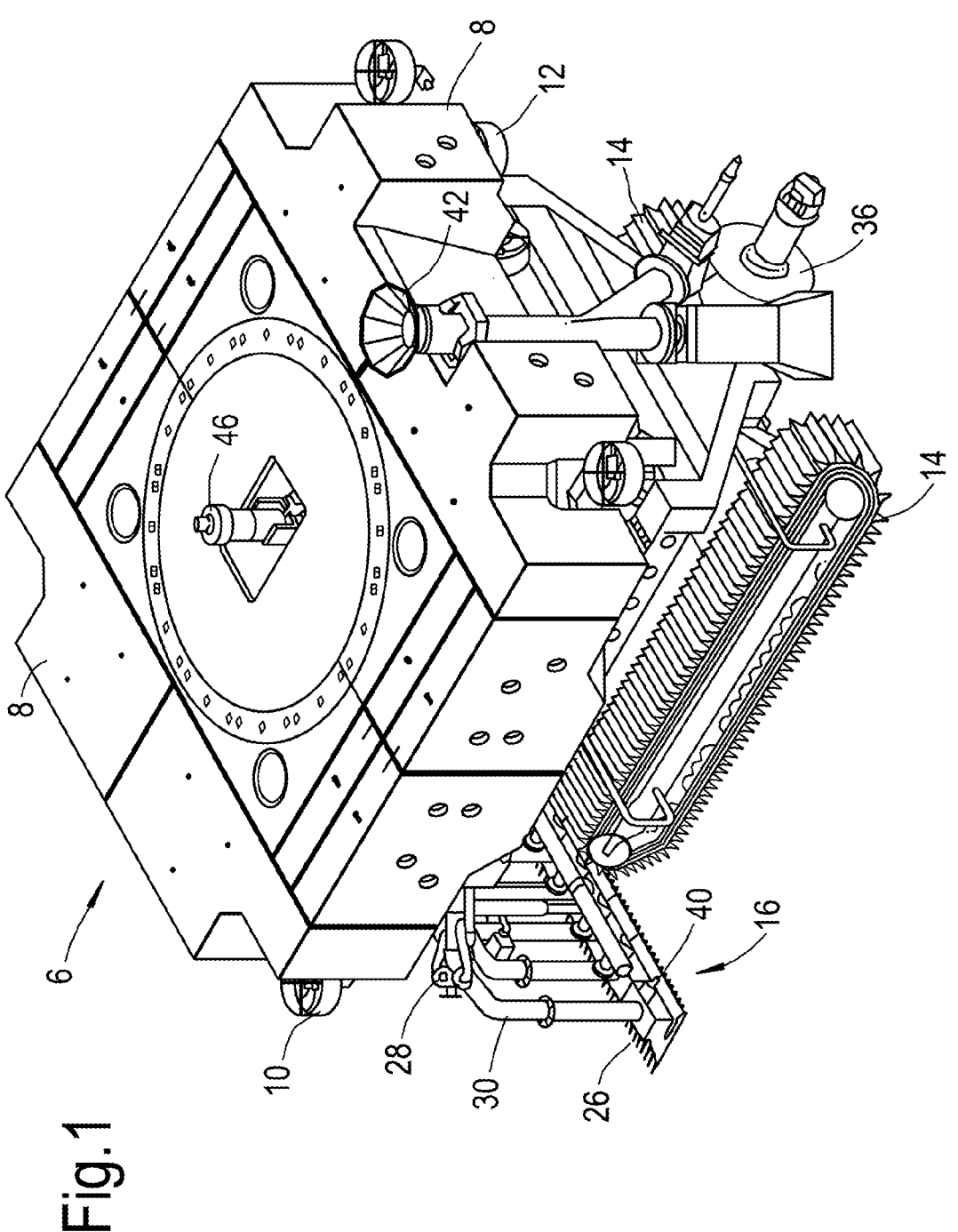
FIG. 1 is a rear and side perspective view of a nodule mining apparatus of a first embodiment.
Figures 2, 3:
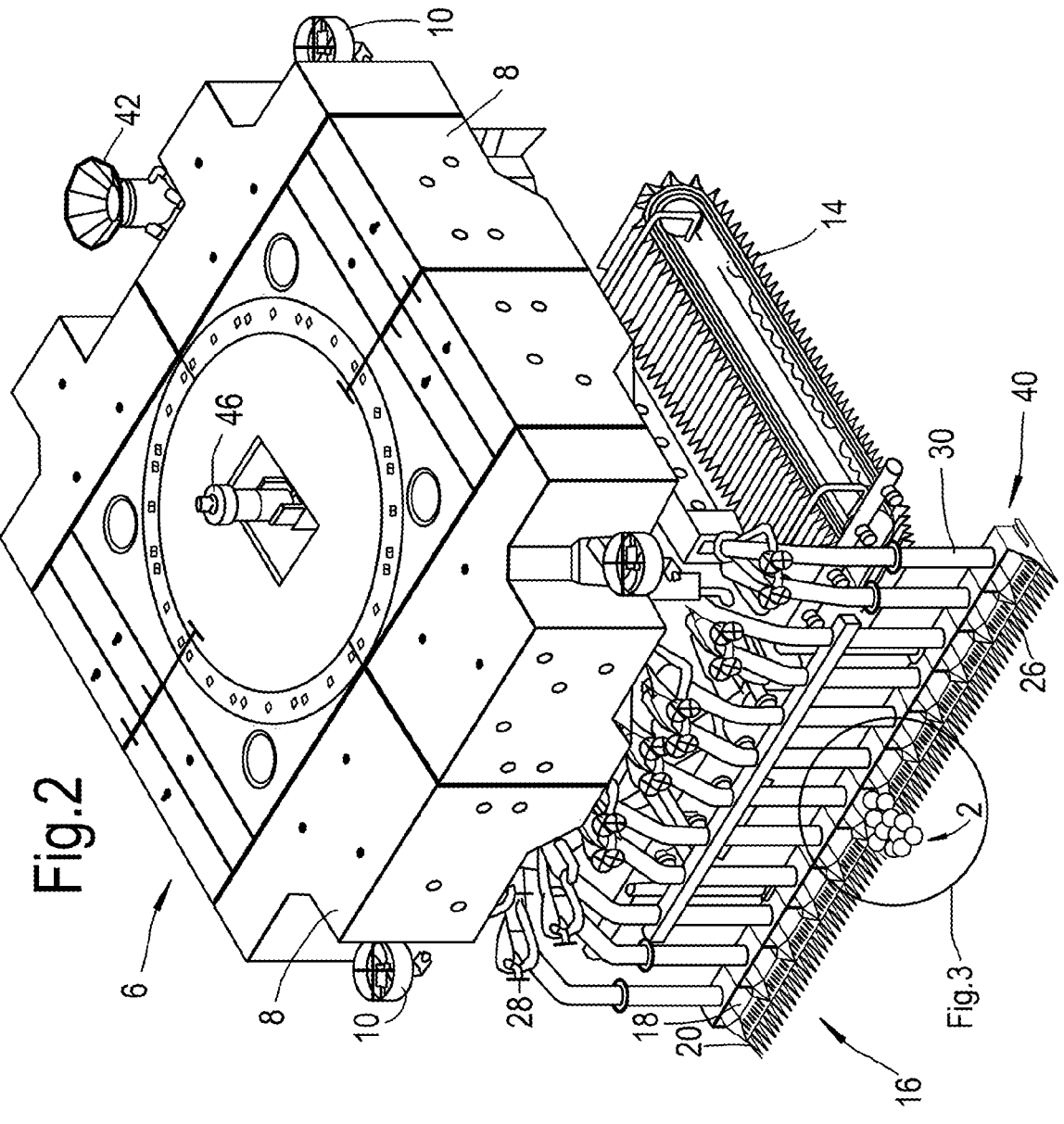
FIG. 2 is a front and side perspective view of the nodule mining apparatus of FIG. 1.
FIG. 3 is a detailed view of part of the nodule mining apparatus of FIG. 2.
Figure 3:
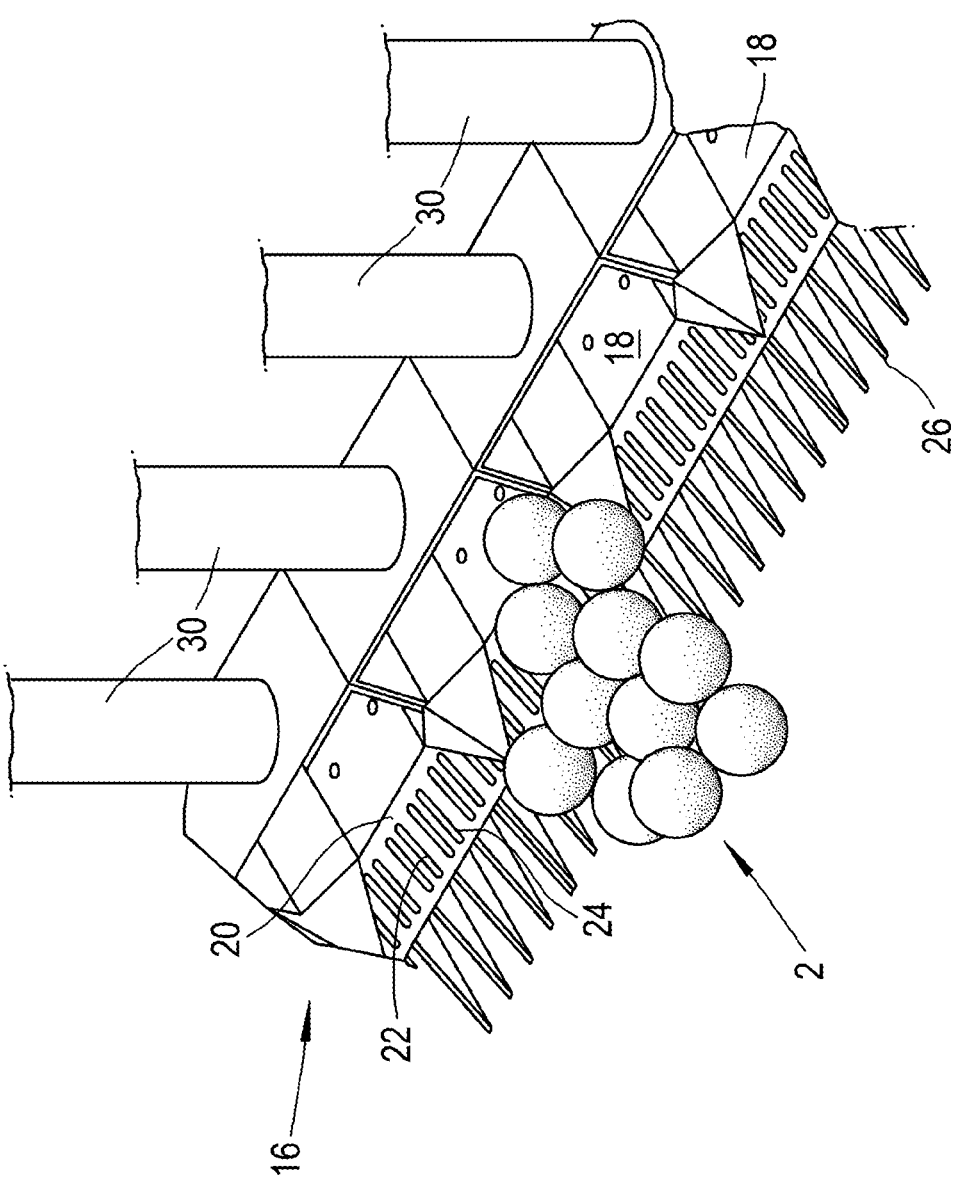
Figure 4:
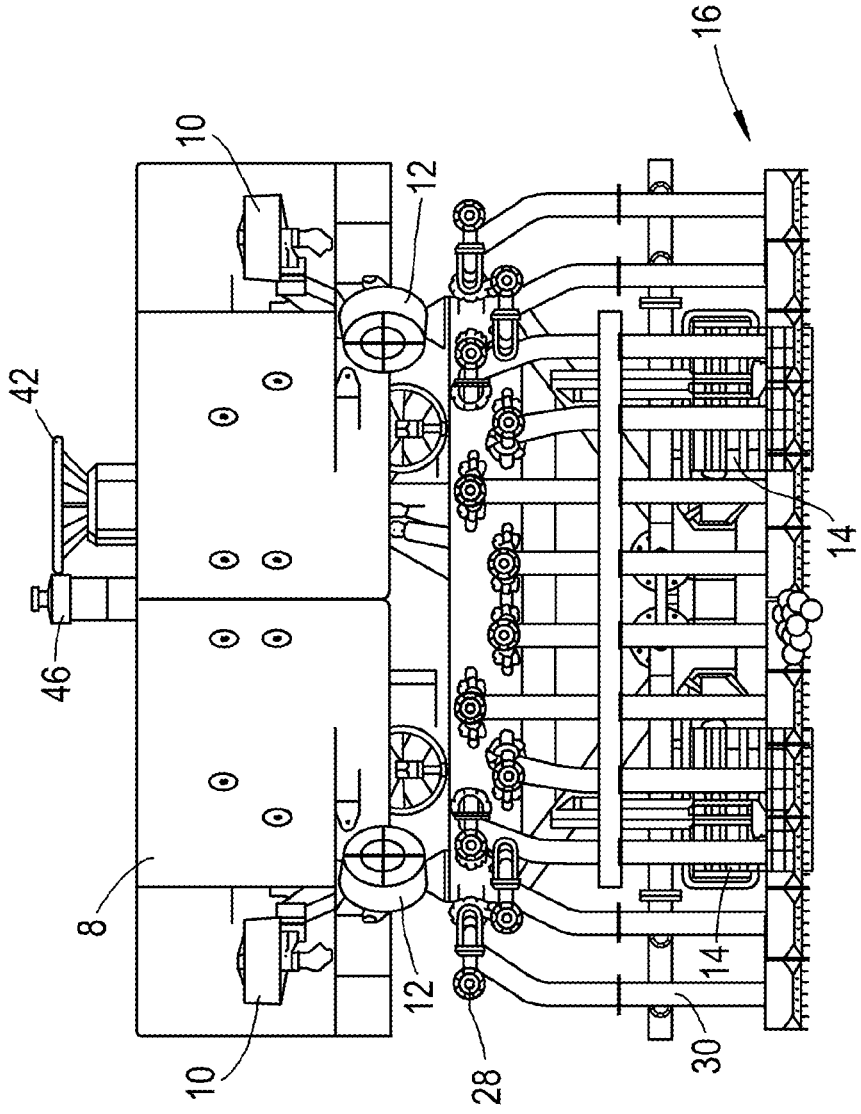
FIG. 4 is a front view of the apparatus of FIG. 1 with a collector unit having ducts in an unfolded condition.
Figure 5:
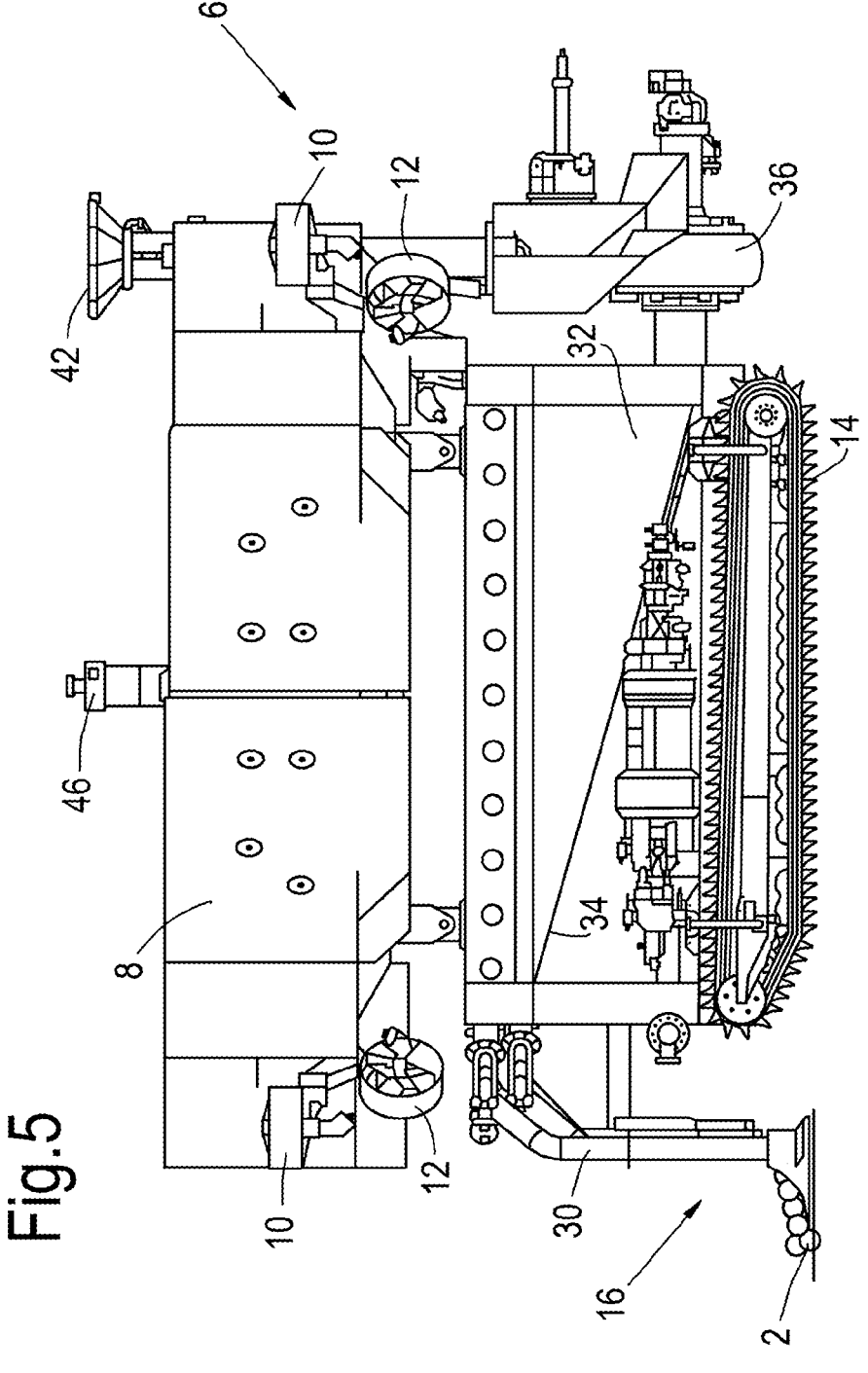
FIG. 5 is a side view of the apparatus of FIG. 4.
Figure 6:
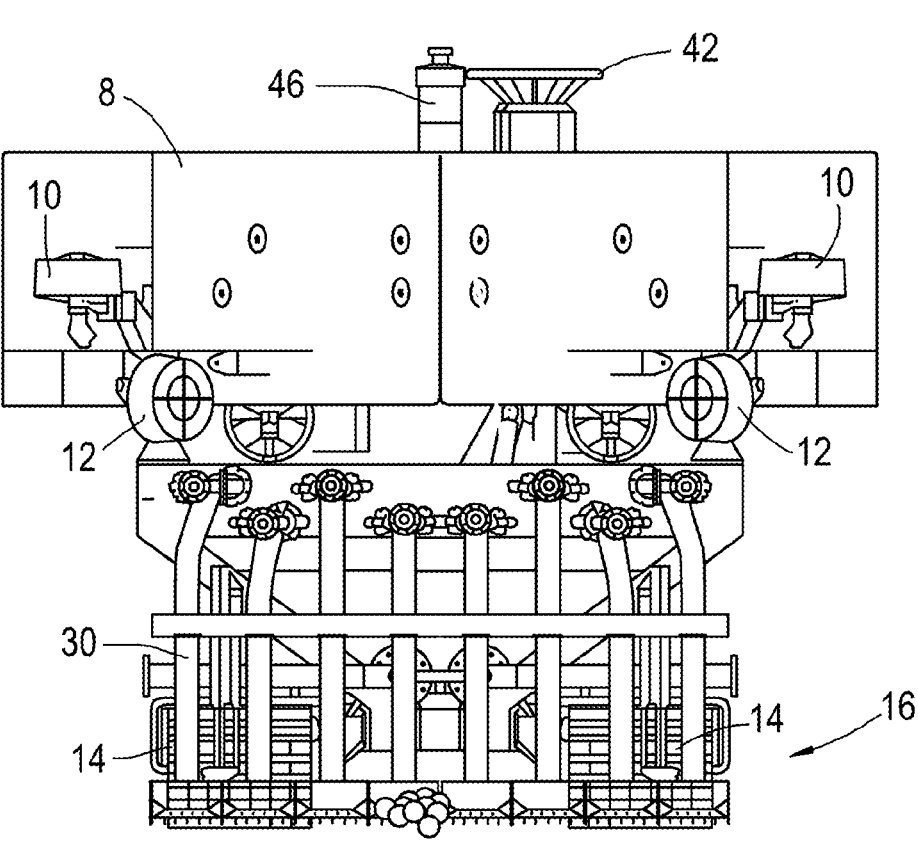
FIG. 6 is a front view of the apparatus of FIG. 1 with the collector unit having ducts in a folded condition.
Figure 7:
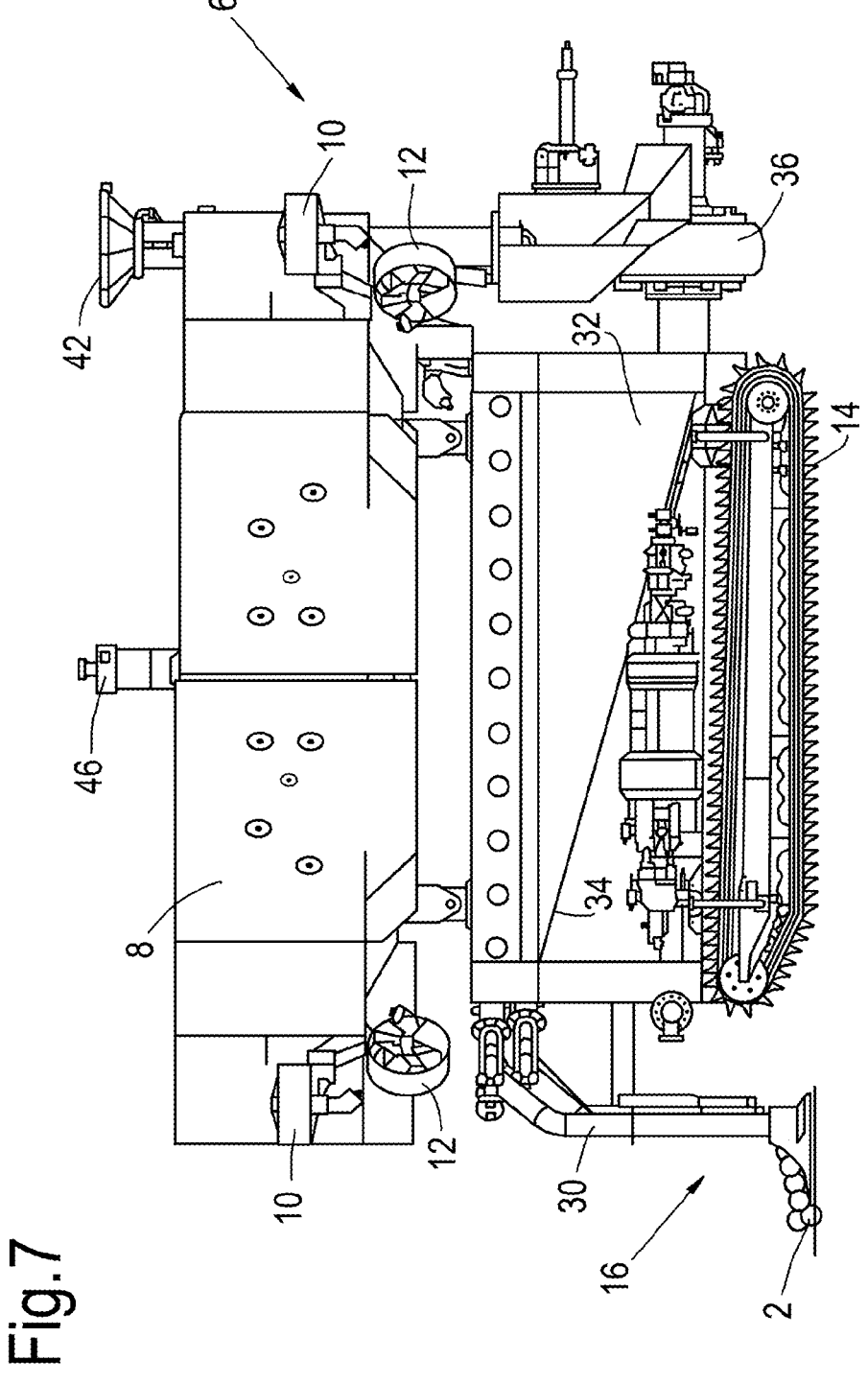
FIG. 7 is a side view of the apparatus of FIG. 6.

Referring to FIGS. 1 to 10, an apparatus embodying the present disclosure for removing nodular material 2 (FIG. 3) from the seabed 4 (FIG. 8) comprises a nodule mining vehicle 6 having buoyancy members 8 for reducing the weight of the vehicle 6 in water, first moving means in the form of first thrusters 10 for moving the vehicle 6 vertically relative to the seabed 4, and second moving means in the form of second thrusters 12 for moving the vehicle 6 horizontally relative to the seabed 4 when not directly in contact with the seabed 4. The vehicle 6 is also provided with tracks 14 for moving the vehicle 6 relative to the seabed 4 when the vehicle 6 is in contact with the seabed 6, and for steering the vehicle 6.

Material removing means in the form of a collector unit 16 is provided forward of the tracks 14, and has a plurality of inlets 18 for receiving nodular material 2 removed from the seabed 4. The collector unit 16 has separator means for separating nodular material 2 from non-nodular material such as sediment in the form of a ramp 20 having a surface 22 inclined relative to the seabed 4, and second apertures 24 for allowing sediment to pass through the second apertures 24 while preventing the nodules 2 from passing through the second apertures 24. Floor engaging means comprising protrusions in the form of tines 26 engages the seabed 4 and engages nodules 2 located on the seabed 4 to assist their entry into the collector unit 16. The tines 26 are arranged forwards of the inlets 18 and extend forwardly of the vehicle 6 in the direction of travel of the vehicle 6. This enables the tines 26 to engage nodules 2 such that the nodules 2 slide up ramps 20 into inlets 18, while minimising disturbance of the seabed 4, thereby minimising the environmental impact of the nodule collection process.

The collector unit 16 is provided with suction means in the form of eductors 28 connected via respective ducts 30 to the inlets 18 for removing nodules 2 from the inclined surface 22 of the ramp 20. The ducts 30 lead to containment means in the form of a tank 32 having an inclined bottom surface 34 to enable the nodules 2 to collect at the rear of the tank 32 where they are contained prior to being pumped to the surface by means of a dredge pump 36 and further pumps (not shown) on a riser 38 via which the nodules 2 are transported to the surface. The eductors 28 can reverse the flow of water through the conduits 30 to assist in clearing blockages.

The collector unit 16 is also provided on its rear surface with first apertures 40, to enable nodules 2 to pass therethrough in the event of blockage of one or more of the ducts 30. This prevents the respective ducts 30 from becoming blocked, by preventing the nodules 2 from blocking the inlets 18 as the vehicle 6 moves forwards.

The outlet of the dredge pump 36 is connected to connecting means in the form of a latching mechanism 42 to enable the vehicle 6 to be connected to the riser 38 to enable the nodular material 2 to be pumped from the tank 32 to a vessel located on the surface. The latching mechanism 42 extends generally vertically and is pivotally mounted to the vehicle 6. This enables the vehicle 6 to easily rotate through 180 degrees at the end of a track to enable more effective harvesting of nodules 2 to take place.

Figure 8:
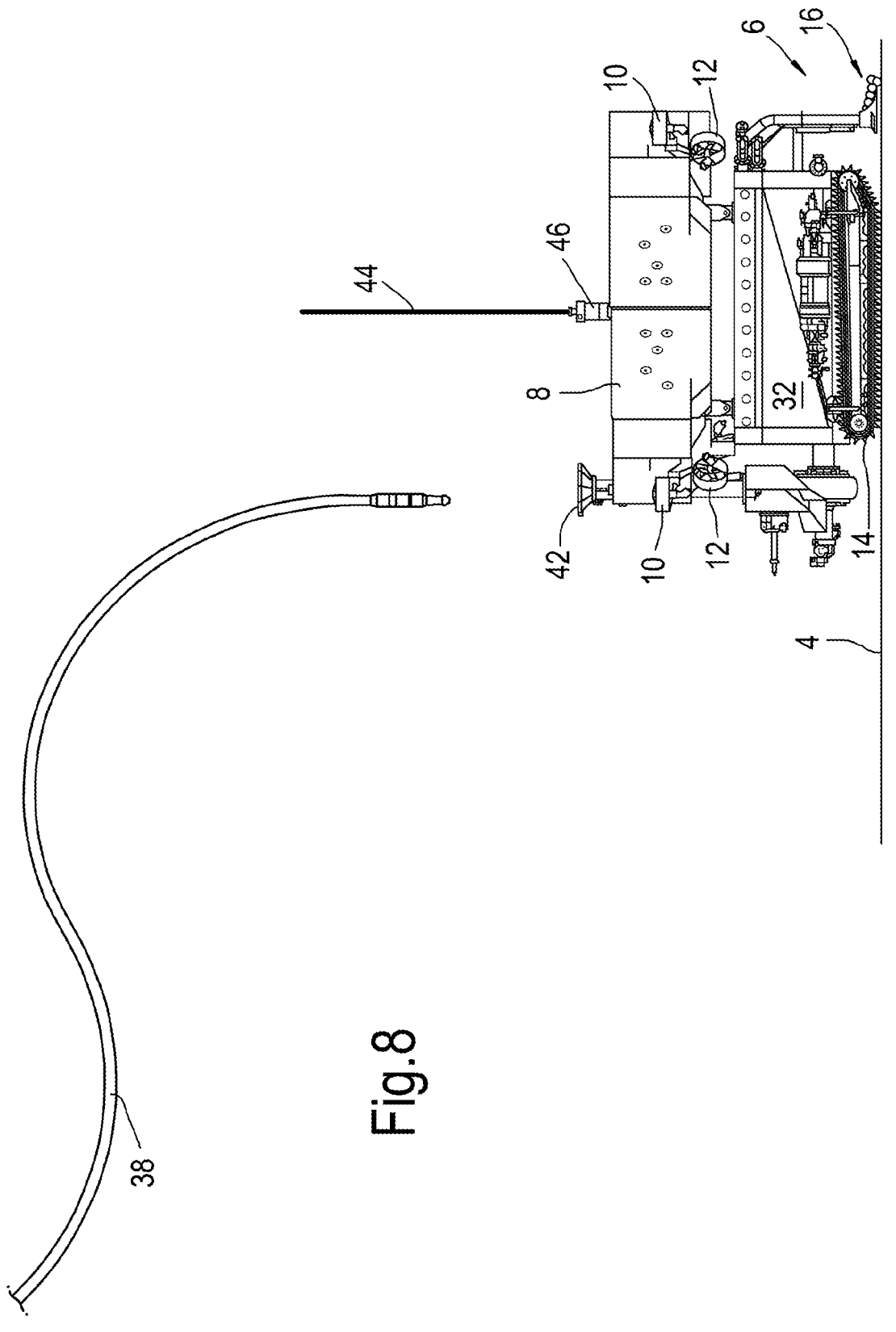
FIG. 8 shows the apparatus of FIG. 1 being lowered to the seabed.
Figure 9:
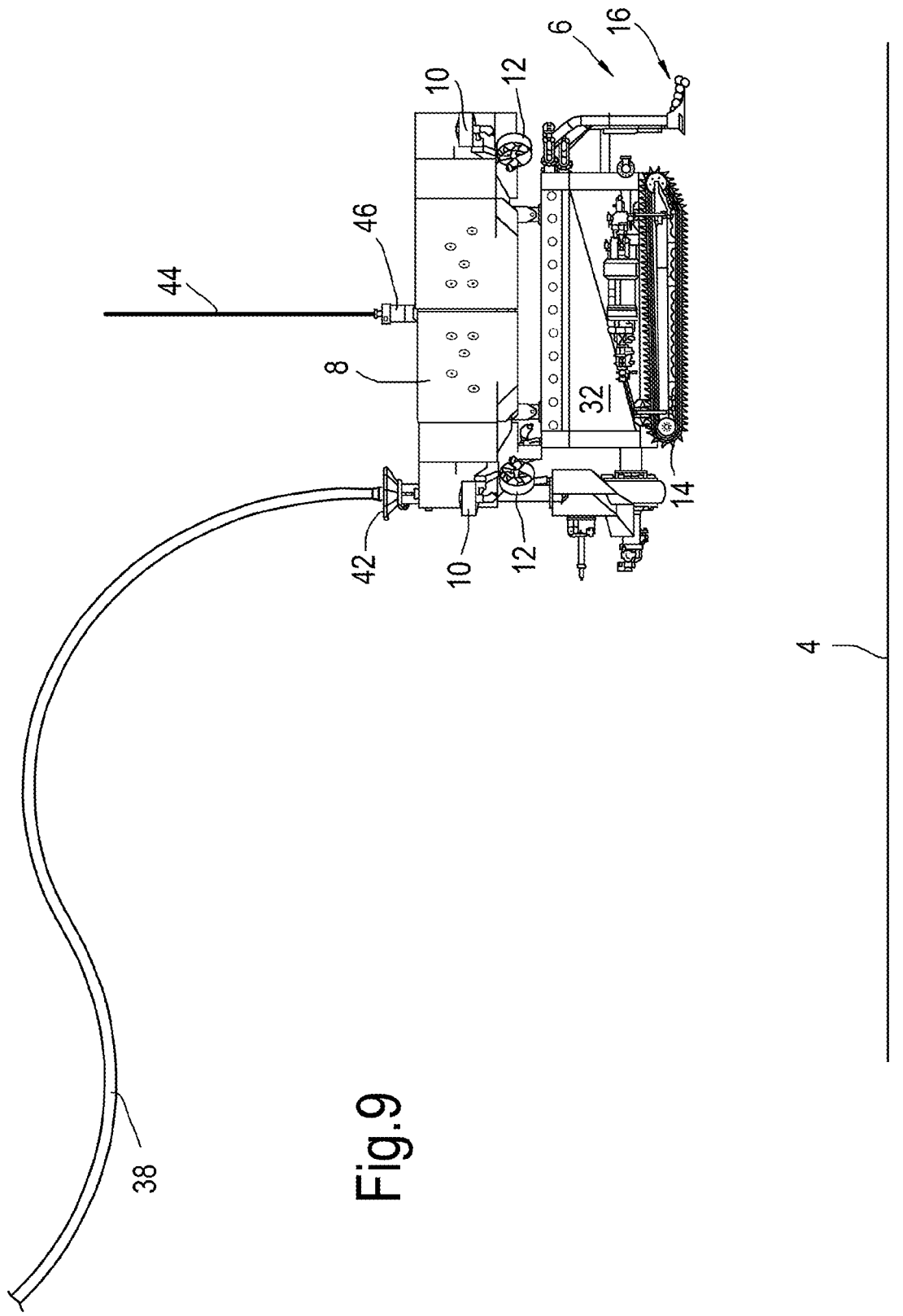
FIG. 9 shows the apparatus of FIG. 1 connecting to a riser.
Figure 10:
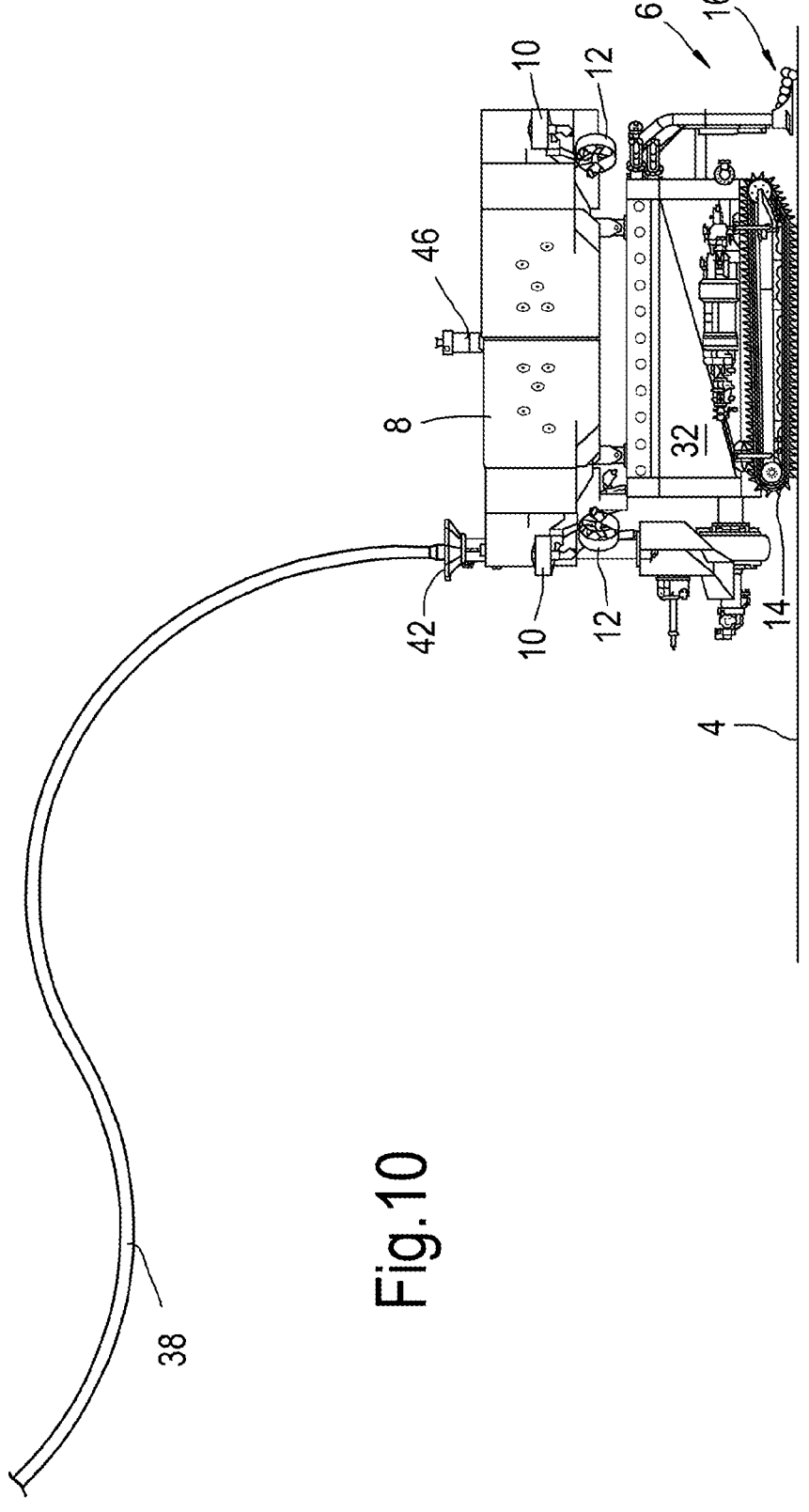
FIG. 10 shows the apparatus of FIG. 1 harvesting nodules.
Figure 14:
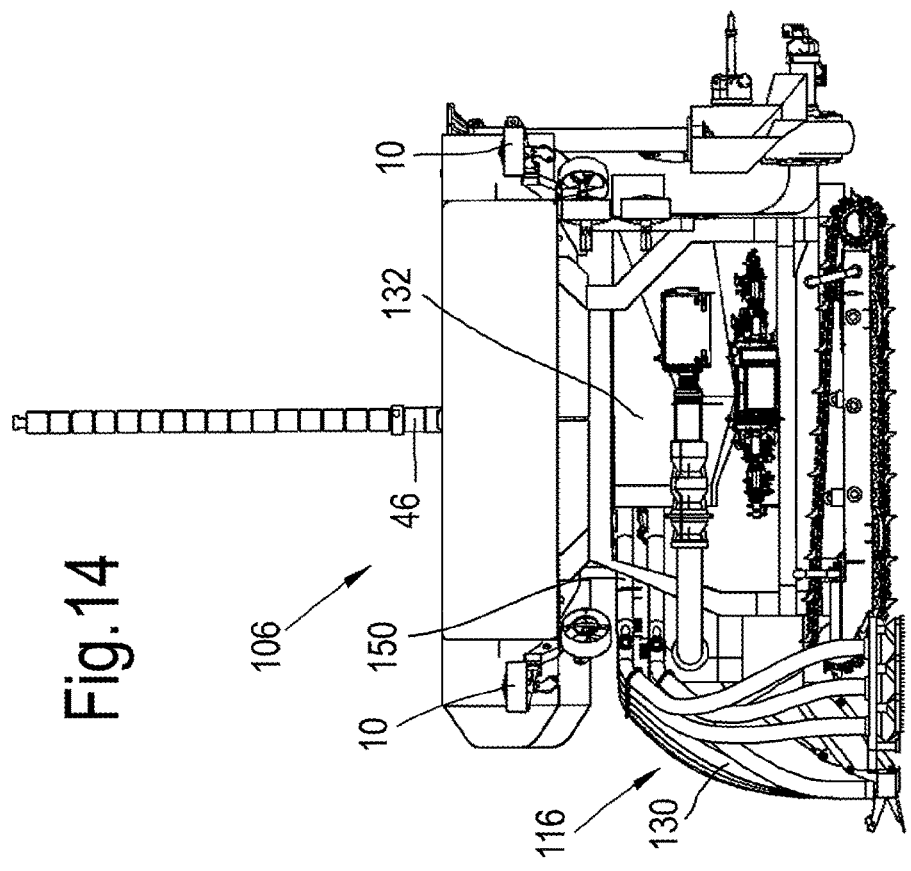
FIG. 14 is a side view of the apparatus of FIG. 13.
Figure 13:
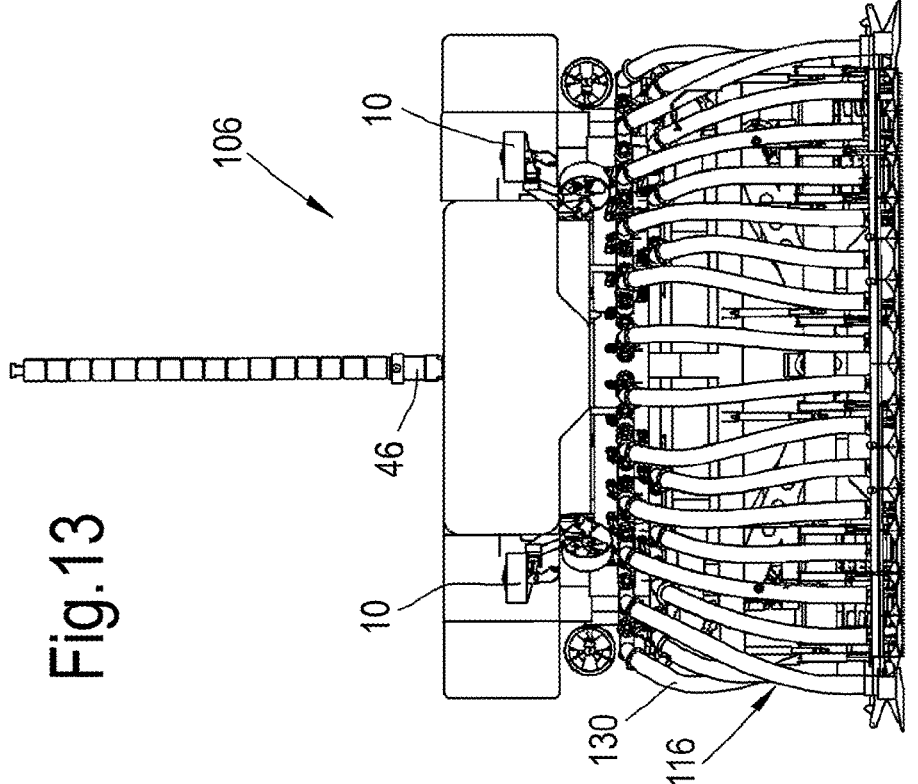
FIG. 13 is a front view of the apparatus of FIG. 11 with the collector unit having ducts in a folded condition.
Figure 15:
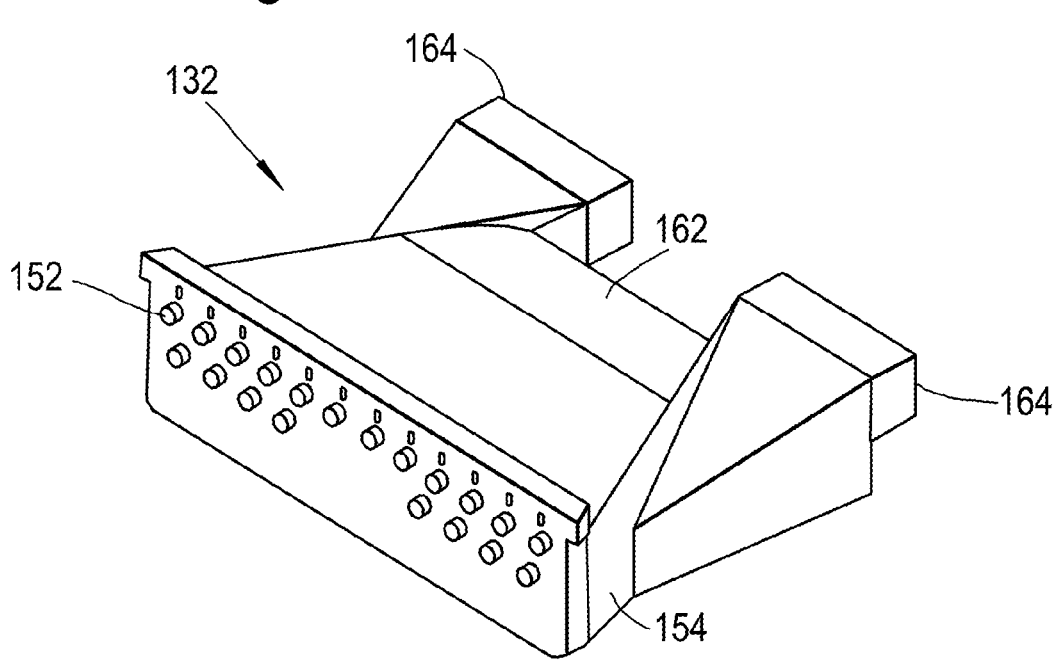
FIG. 15 is a front perspective view of a separator apparatus of the apparatus of FIG. 11.
Figure 16:
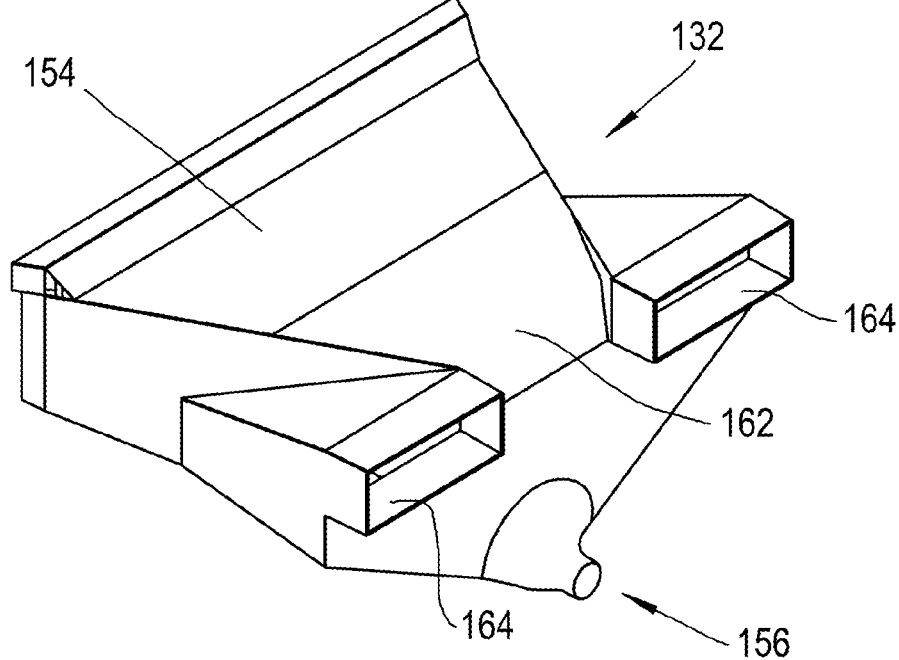
FIG. 16 is a rear perspective view of a separator apparatus of FIG. 15.

The operation of the vehicle 6 will now be described with reference to FIGS. 8 to 10.

Initially, the vehicle 6 is lowered from a surface vessel (not shown) by means of an umbilical cable 44 connected to a suspension point 46 to the seabed 4. As shown in FIG. 8. The vehicle 6 then lifts from the seabed 4 by means of the first thrusters 10 and second thrusters 12 to enable the latching mechanism 42 of the vehicle 6 to connect to the riser 38. The vehicle 6 then returns to the seabed 4 and moves along the seabed 4 by means of the second thrusters 12 and/or tracks 14 to harvest nodules 2, as shown in FIG. 10.

Referring to FIGS. 11 to 17, in which parts common to the embodiment of FIGS. 1 to 10 are denoted by like reference numerals but increased by 100, a vehicle 106 of a second embodiment is shown. The vehicle 106 has a collector unit 116 including separately foldable collector ducts 130 which can be moved between a folded condition (FIGS. 13 and 14), to enable the vehicle 106 to be more compact as it is being deployed to the sea bed, and an unfolded condition (FIGS. 11 and 12), in which the lateral width of the collector unit 116 is at its maximum. The collector ducts 130 are connected to conduits 150 (FIGS. 12, 14) which in turn are connected to inlets 152 to a separator apparatus, including the tank 132, for separating nodules from non-nodular material such as silt or sediment. The inlets 152 are directed towards a laterally central region of the tank 132.

Figure 17:
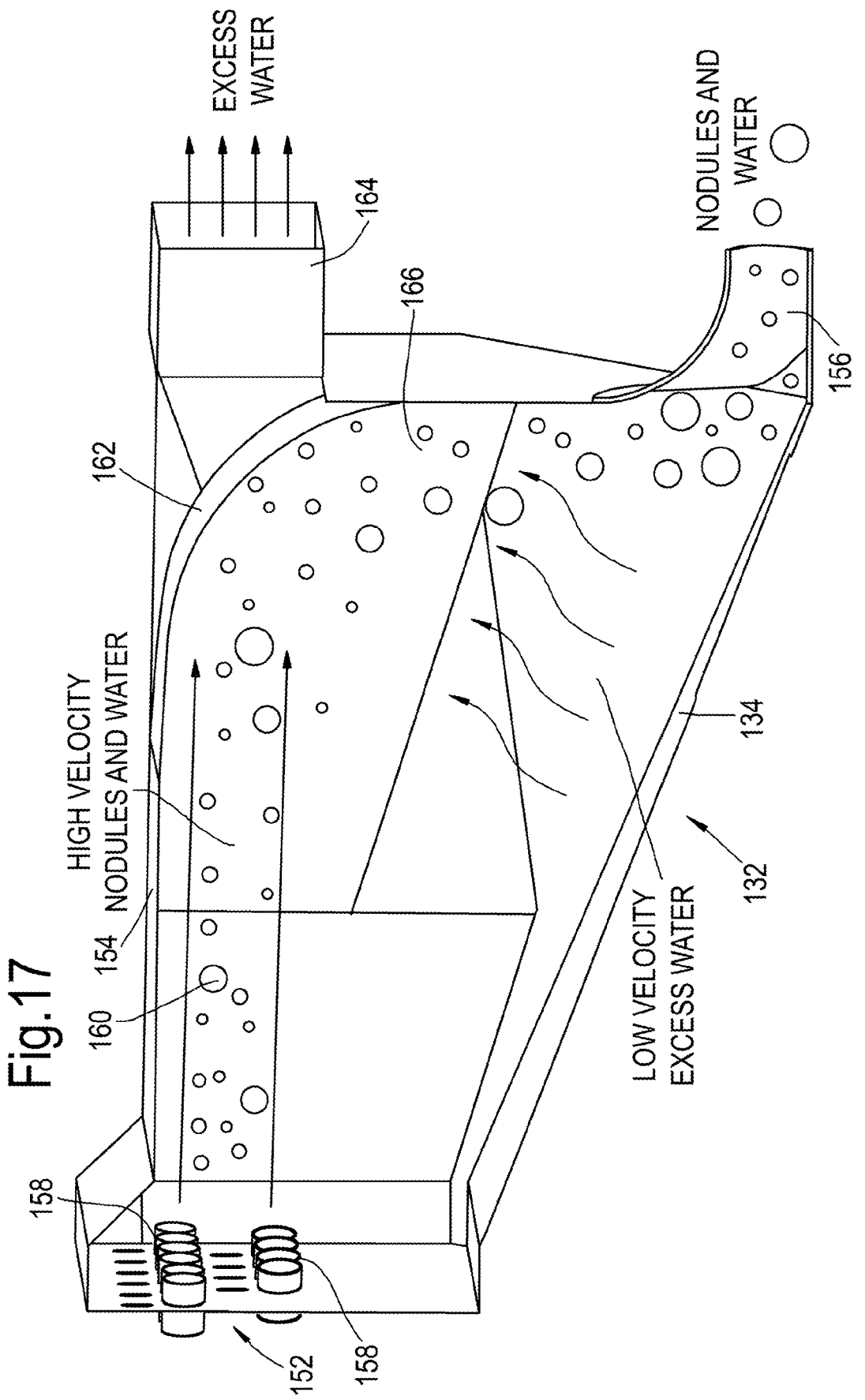
FIG. 17 is a cross sectional view of the tank of the separator apparatus of FIG. 15.

The separator apparatus is shown in more detail in FIG. 17. The tank 132 has a body 154 which is tapered from the inlets 152 towards a first outlet 156 arranged at a lower part of the tank 132. The inlets 152 into the tank 132 define nozzles 158, which cause the velocity of water 160 containing nodules and non-nodular material to be reduced as it enters the tank 132. As a result, nodules tend to settle towards the bottom 134 of the tank 132, while non-nodular material remains in suspension in the water.

Directing water containing nodules towards a laterally central part of the tank 132, in cooperation with the tapered tank body 154, minimises turbulence in the flow of water containing nodules, which in turn minimises the extent to which settling of nodules in the vicinity of the first outlet 156 is disturbed. The tank 132 is also provided with flow redirecting means in the form of a curved upper plate 162, for redirecting flow of water containing nodules towards the first outlet 156, while minimising turbulence in the water flow. The tank 132 has an inclined lower surface 134, also extending towards the first outlet 156, which causes nodules to tend to move along the lower surface 134 towards the first outlet 156, especially when the separator apparatus is vibrating when in use.

Second outlets 164 are provided at a greater height than the first outlet 156, and a direct path from the inlets 152 to the second outlets 164 is blocked by means of barrier means in the form of baffle plates 166 arranged at an upper part of the tank 132. As a result, as water containing nodules and non-nodular material is pumped into the tank 132, the nodules have a greater tendency to collect around the first outlet 156, whereas non-nodular material such as silt or sediment can reach the second outlets 164 by passing under the baffle plates 166, so that non-nodular material in suspension can reach the second outlets 164, but it is very difficult for nodules to reach the second outlets 164. In this way, by suitable control of the pumping rate of water out of the first outlet 156 and second outlets 164, the concentration of nodules in water pumped from the first outlet 156 is maximised, and the concentration of nodules in water pumped from the second outlets 164 is minimised. This has the result of minimising the quantity of unwanted non-nodular material pumped to the surface via the riser 38, thereby reducing the environmental impact of returning such material to the seabed, especially if the quantity of such non-nodular material is sufficiently small to enable it to be transported to the shore.

It will be appreciated by persons skilled in the art that the above embodiment has been described by way of example only and not in any limitative sense, and that various alterations and modifications are possible without departure from the scope of the disclosure as defined by the appended claims.

The invention claimed is:

1. An apparatus for removing nodular material from a floor of a body of water, the apparatus comprising:
   moving means for moving the apparatus relative to the floor of the body of water;
   material removing means for removing nodular material from the floor of the body of water; and
   a connector adapted to be connected to a conduit to enable said removed nodular material to be transported to a vessel on the surface of the body of water;
   wherein the material removing means comprises at least one inlet and floor engaging means for engaging the floor of the body of water, wherein the floor engaging means comprises a plurality of protrusions adapted to be arranged forwards of the at least one inlet in a direction of travel of the apparatus and to extend substantially in the direction of travel of the apparatus;
   separator means arranged upstream of the at least one said inlet for separating nodular material from non-nodular material of the floor of the body of water, wherein the separator means includes at least one surface inclined in use relative to each of the floor of the body of water and the at least one inlet and having at least one upstream aperture therethrough for enabling non-nodular material to pass therethrough and preventing said nodular material from passing therethrough; and
   a collector unit with suction means in the form of eductors connected via respective ducts to the respective at least one inlet.

2. The apparatus according to claim 1, wherein the plurality of protrusions comprises a plurality of tines.

3. The apparatus according to claim 1, further comprising at least one downstream aperture arranged rearwards of the at least one inlet in the direction of travel of the apparatus for allowing nodular material to pass therethrough.

4. The apparatus according to claim 1, further comprising wherein the suction means is configured for removing nodular material from the at least one inlet.

5. The apparatus according to claim 4, wherein the suction means is adapted to reverse the direction of flow of water therethrough.

6. The apparatus according to claim 1, wherein the collector unit is provided on a rear surface with apertures.

\* \* \* \* \*